United States Patent

Cobben et al.

[11] Patent Number: 5,889,614
[45] Date of Patent: *Mar. 30, 1999

[54] PRESENTATION SYSTEM WITH OVERHEAD PROJECTOR

[75] Inventors: Louis M. H. Cobben; Martinus V. C. Stroomer, both of Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 575,538

[22] Filed: Dec. 20, 1995

[30] Foreign Application Priority Data

Dec. 22, 1994 [EP] European Pat. Off. ............ 94203720

[51] Int. Cl.$^6$ ............................ G02B 05/30; G03B 21/14
[52] U.S. Cl. ................................ 359/483; 349/6; 353/20
[58] Field of Search ................................ 359/237, 483, 359/486; 349/10, 6; 353/20

[56] References Cited

U.S. PATENT DOCUMENTS

| | | |
|---|---|---|
| 3,126,786 | 3/1964 | Appeldorn . |
| 4,818,074 | 4/1989 | Yokoi et al. . |
| 4,928,123 | 5/1990 | Takakuji ................................ 353/20 |
| 5,206,673 | 4/1993 | Kawahara et al. ..................... 353/98 |
| 5,251,065 | 10/1993 | Uetsuki ................................ 359/454 |
| 5,333,072 | 7/1994 | Willett ................................ 354/41 |
| 5,444,570 | 8/1995 | Uetsuki et al. ..................... 354/483 |
| 5,486,884 | 1/1996 | De Vaan ............................... 353/122 |
| 5,617,226 | 4/1997 | Ohmae et al. ........................ 344/10 |
| 5,631,750 | 5/1997 | Minoura et al. ..................... 349/110 |

FOREIGN PATENT DOCUMENTS

| | | |
|---|---|---|
| 0295913B1 | 2/1988 | European Pat. Off. .......... G02F 1/13 |
| 0490171A2 | 6/1992 | European Pat. Off. ...... G02F 1/1335 |
| 0573905A1 | 12/1993 | European Pat. Off. ........ G02B 27/28 |
| 9422851-5 | 12/1993 | European Pat. Off. . |
| 0606940A2 | 7/1994 | European Pat. Off. .......... G02B 5/30 |
| 415634 | 1/1992 | Japan .......................... G03B 21/132 |

OTHER PUBLICATIONS

"Digital Micromirror Array for Projection TV" by Michael A. Mignardi, Solid State Technology, Jul. 1994, pp. 63–68.
"Polarizing Color Filters Made From Cholesteric LC Silicones", by Robert Maurer et al, SID 90 Digest, pp. 110–113.
"Retardation Film for STN–LCDs NRF" by the firm of Nitto Denko in SID '92, Exhibit Guide, Society for Information Display, May 17–22, 1992, Boston, MA., USA, pp. 8–13.
"A full–Color TFT–LCD with a Polymer Dispersed Structure" by H. Yoshida et al, in Japan Display '92, pp. 631–634.

Primary Examiner—Mark Hellner
Attorney, Agent, or Firm—F. Brice Faller

[57] ABSTRACT

A presentation system comprising an image projection screen and an overhead projector is described. The overhead projector comprises an illumination system, a support for supporting an image record carrier and a projection head for projecting the image present in the image record carrier on the image projection screen. The image projection screen is a polarizing screen which transmits radiation having a well-defined direction of transmission polarization, and the overhead projector is adapted to supply light having this direction of polarization. In this way, the quantity of radiation used for forming the image is considerably increased and substantially half the quantity of ambient light incident on the screen is suppressed, so that images having a considerably enhanced contrast and brightness are obtained.

12 Claims, 4 Drawing Sheets

PRESENTATION SYSTEM WITH OVERHEAD PROJECTOR

BACKGROUND OF INVENTION

The invention relates to a presentation system comprising an image projection screen and an overhead projector which is provided with an illumination system, a support for supporting an image record carrier and a head for projecting the image present in the image record carrier on the image projection screen.

The image record carrier may be a transparent plate referred to as overhead sheet, which has a permanent image, or an image display panel comprising a matrix of pixels with which images can be generated electronically. Such an image display panel may be connected, for example to a computer so that computer images can be displayed. The panel may be, for example a TN-LCD panel (twisted-nematic liquid crystal display panel) so that the direction of polarization of the incident light is modulated in conformity with the image information to be displayed. The image display panel may alternatively be a PDLC panel (polymer-dispersed liquid crystal panel) which operates on the basis of dispersion of the incident light, either or not in combination with two complementary polarizers. An image of the image information present in the image record carrier is formed and projected by means of the projection head of the overhead projector.

The invention also relates to an overhead projector which supplies light having a well-defined state of polarization for use in such a presentation system.

An overhead projector suitable for use in a presentation system of the type described in the opening paragraph and intended for projecting the image of a transparent foil is known from, for example U.S. Pat. No. 3,126,786. The overhead projector described in this Patent successively comprises an illumination system consisting of a lamp and a reflector, a condenser lens, preferably in the form of a Fresnel lens, a support for supporting an image record carrier and a projection head for reflecting and focusing the projection beam from the image record carrier on a projection screen.

A drawback of a presentation system with an overhead projector as is known from said Patent is that, in addition to the light coming from the overhead projector and comprising the image information, which light is further referred to as signal light, also ambient light will be incident on the projection screen and reflected by this screen towards the audience. To obtain an image on the projection screen which is sufficiently rich in contrast during a presentation, at which illustrations, graphs and the like are shown by means of an overhead projector, the audience space will have to be darkened considerably. This darkening, which is often necessary more than once during a lecture, is a disturbing and detracting operation. Moreover, the darkening reduces the quantity of light for the audience. This may be troublesome if they want to make notes, for example. Moreover, the audience is less well visible to the speaker, due to the darker ambience. Until now, the darker ambience has been accepted as a necessity and no useful overhead presentation system has been conceived which can work with a satisfactory contrast without darkening. An increase of the power of the lamp in the illumination system, so that the signal light will be considerably more intensive than the ambient light, is not a good solution because the lamp must then be cooled thoroughly, which necessitates the use of a fan causing a disturbing noise, which is troublesome, particularly during lectures.

SUMMARY OF THE INVENTION

It is an object of the present invention to provide a presentation system which, under normal lighting conditions in the audience space, yields an image on the projection screen which is sufficiently rich in contrast.

To this end, the presentation system according to the invention is characterized in that the image projection screen is a polarizing screen which transmits radiation having a well-defined direction of polarization, and in that the overhead projector is adapted to supply signal light having said direction of polarization.

Since the signal light has the same direction of polarization as the direction of polarization transmitted by the screen, this light is substantially completely transmitted on its path to and from the reflective coating in the screen. In this way, the signal light is fully utilized for forming the image to be observed by the audience. However, the ambient light is unpolarized so that only half of the light incident on the screen will be transmitted to the reflective coating and reflected towards the audience space. In this way, a considerable improvement of the image contrast is achieved.

The invention further relates to an overhead projector for projecting the image of an image record carrier which modulates unpolarized light with image information and which is suitable for use in a presentation system according to the invention. The overhead projector according to the invention is characterized in that the illumination system comprises a polarizer.

An alternative embodiment of the overhead projector according to the invention, in which the intensity of an unpolarized light beam is directly modulated with image information, is characterized in that the illumination system comprises a polarizer.

Examples of image record carriers to which the two previous claims relate are a transparent foil, a PDLC panel without polarizers, as is known, for example from European Patent Application EP 0 490 171 A2 (U.S. Pat. No. 5,631, 750) and a DMD panel (Digital Micromirror Device) if the overhead projector operates with a reflective image record carrier. A DMD panel is known from, for example the article: "Digital micromirror array for projection TV" by Michael A. Mignardi in Solid State Technology, Jul. 1994, pp. 63–68. A DMD panel is especially developed for projection in reflection and has the advantage of an efficient use of projection light.

A PDLC panel comprises a liquid crystalline polymer layer as an optically active dispersive medium. The liquid crystalline material is dispersed in the form of drops in a transparent polymer. At both sides of the layer, control electrodes are provided in such a way that an electric field can be applied across each pixel in conformity with the image information to be displayed by the relevant pixel. Incident light is dispersed in conformity with the electric fields applied across the pixels and converted into an image by means of, for example Schlieren optics. Such a PDLC panel operates with unpolarized light.

A DMD is a semiconductor element which is made from a single silicon wafer and comprises a matrix of deformable mirror elements. Each mirror element may tilt in conformity with a voltage applied across the element and representing the image information to be displayed. In this way, light which is incident on the matrix of mirror elements is reflected at different angles into or out of the system. Subsequently, the light reflected in the system by means of an optical system is concentrated and converted into an image via a lens system. The image information to be reproduced is thus derived from the angles at which the incident light is reflected by the mirror elements, rather than from the modulation of the state of polarization presented to the panel. When a linearly polarized beam is presented to a DMD panel, the state of polarization of the presented light will not be influenced.

The polarizer in the illumination system ensures that only the component having the desired direction of polarization of the light emitted by the lamp of the illumination system is transmitted towards the support. The desired direction is the direction which corresponds to the direction of polarization transmitted by the screen on which the image is to be projected. In this way, an image which is rich in contrast can be realised without darkening the audience space.

The invention also relates to an overhead projector intended for use in a presentation system and suitable for projecting an image in an electronically controllable image display panel which modulates the state of polarization of a polarized projection beam so as to obtain signal light whose intensity is modulated with image information. This overhead projector is characterized in that the illumination system comprises a polarizer for obtaining signal light having a direction of polarization which corresponds to the direction of polarization transmitted by the image projection screen.

Examples of such image record carriers are a TN-LCD panel and a PDLC panel with polarizers.

In a TN-LCD panel the liquid crystalline material is enclosed between two complementary polarizers. In the unenergized state, the direction of polarization of incident light is rotated 90° in the liquid crystalline layer. Consequently, light which is passed by the first polarizer will also be passed by the second polarizer, referred to as the analyzer. When a pixel is energized, the rotation of the direction of polarization for this pixel will be less than 90° and will consequently not have the desired direction of polarization for the second polarizer, and will thus be blocked. The direction of polarization transmitted by the first polarizer is thus modulated per pixel in a liquid crystalline layer in conformity with the image information to be displayed by means of this pixel. The part of the light which is passed by the second polarizer, i.e. the analyzer, constitutes the clear pixels of the image.

In a PDLC panel with polarizers, the optically active dispersive medium is between two polarizers having a complementary direction of polarization and with control electrodes being provided at both sides. Dependent on the presence or absence of a voltage across the electrodes in a pixel, the PDLC for this pixel will be transmissive or dispersive. In combination with the two complementary polarizers, this results in a dark or a bright image for the relevant pixel. As compared with a PDLC without polarizers, a PDLC with two complementary polarizers has the advantage of a larger tolerance as far as the viewing angle is concerned. Such a PDLC panel is known from, for example the article "A full-colour TFT-LCD with a polymer dispersed structure" by H. Yoshida et al. in Japan Display '92, pp. 631–634.

An overhead projector provided with a TN-LCD image display panel is known per se from European Patent Application EP 0 573 905 A1, but in this Application no measures are taken to enhance the contrast of the projected light, but measures to prevent heating of the LCD panel and measures to make efficient use of the available light.

EP 0 573 905 A1 not only relates to the overhead projector itself but also to the LCD panel. Such a panel is surrounded by a polarizer and an analyzer. To have a minimal extent of heat development in the polarizer, the panel is preferably irradiated by polarized light which is adapted to the polarizer. However, if the panel is irradiated with unpolarized light, substantially half this light is blocked by the polarizer. If the polarizer is an absorbing polarizer, too much heat will be developed in the polarizer. Since this polarizer is already relatively proximate to the liquid crystalline material, this material may be damaged due to heat development. Said Patent Application provides a solution to this problem by replacing the absorbing polarizer by a retroreflective polarizer which is arranged between the light source and the liquid crystalline layer. Furthermore, a $\lambda/4$ plate or a birefringent plate having a varying optical thickness is then to be arranged between the polarizer and the light source so as to convert the reflected s-polarized light into p-polarized light. The p-polarized light can subsequently be transmitted to the support by the retroreflective polarizer.

The retroreflective polarizer of EP 0 573 905 is constituted by two transparent plates which are arranged against each other and whose facing surfaces are corrugated, while a packet of layers alternately having a high and a low refractive index is arranged between these surfaces. The manufacture of such a reflector is relatively expensive and cumbersome due to the thickness and the number of layers.

EP 0 573 905 starts from an overhead projector in which linearly polarized light is already used, i.e. an overhead projector for LCD panels, and does not describe an overhead projector for image record carriers which modulate unpolarized light such as transparent plates and a PDLC panel without polarizers. The problem of the contrast reduced by the ambient light is not mentioned and a solution to this problem is not given.

If the image record carrier modulates the state of polarization of a polarized beam, the polarizer in the illumination system of the overhead projector not only has the function of enhancing the image contrast but also of polarizing the light incident on the image record carrier so that heating due to absorption of the unwanted direction of polarization in the vicinity of the record carrier is avoided.

The polarizer in the illumination system of said overhead projectors may be an absorbing polarizer which passes the component having the desired direction of polarization of the light supplied by a lamp within the illumination system to the support and absorbs the rest of the light.

However, optimum use is made of the inventive idea if the overhead projector is further characterized in that the polarizer is a reflecting polarizer and in that the illumination system is provided with a reflector which partly surrounds the lamp of this system at least at a side facing away from the polarizer.

The light component having the unwanted direction of polarization is now reflected towards the reflector by the reflecting polarizer.

This reflector may be, for example depolarizing. In that case the light reflected by the reflecting polarizer is converted into unpolarized light by the reflector. A part thereof will then be suitable to be passed by the polarizer, while the other part is sent to the reflector where it is depolarized again, and so forth.

The reflector may alternatively be a specular reflector. If the polarizer is a circular polarizer, the direction of polarization reflected by the reflecting polarizer is inverted in its direction of rotation by the reflector so that it is also suitable to be passed by the polarizer towards the support. If the polarizer is a linear polarizer, a $\lambda/4$ plate is to be arranged between the reflector and the polarizer so as to convert the unwanted linear direction of polarization into the desired direction.

In each of the cases mentioned, substantially all the light supplied by the lamp is converted into light having the desired direction of polarization. If such an overhead projector is used in a presentation system according to the invention, an image is obtained which does not only have a high contrast but also a great brightness.

A preferred embodiment of the overhead projector according to the invention is characterized in that the polarizer is a cholesteric filter.

Cholesteric filters are optical filters comprising an optical layer of a liquid crystalline material having a cholesteric ordering. This means that the molecules of the material are ordered to form a spiral or helical structure having a pitch p. After such a material has been provided as a thin, optically active layer between two parallel substrates, the helical structure is directed in such a way that the axis of the helix will be transverse to the layer. The alignment of the helix can be improved by providing an orientation layer on the facing surfaces of the substrates.

Such a filter is sensitive to polarization and will reflect a circularly polarized radiation component with a direction of rotation (laevorotatory or dextrorotatory) corresponding to the direction of the molecular helix and having a wavelength corresponding to the pitch p of the helix. A circularly polarized component having the opposite direction of rotation and/or a wavelength which is not adapted to the pitch will be transmitted by the filter. Radiation having the state of polarization and wavelength unsuitable for the filter will thus not be absorbed but transmitted towards the reflector behind the radiation source. Due to reflection on this reflector, the circular state of polarization is inverted so that the radiation will now have a state of polarization which is suitable for the filter.

Cholesteric filters are known per se, for example from the article "Polarizing Colour Filters made from Cholesteric LC Silicons" by R. Maurer et al. in SID International Symposium 1990, Digest of Technical Papers, pp. 110–113. The cholesteric filters described in this article have an optically active layer comprising a liquid crystalline material with a cholesteric ordering on the basis of silicons.

A further embodiment of the overhead projector according to the invention is characterized in that a $\lambda/4$ plate is arranged at the side of the cholesteric filter facing away from the radiation source.

Among image display panels which modulate the state of polarization of light there are, however, both image display panels which modulate linearly polarized light and image display panels which modulate circularly polarized light, dependent on the implementation of the polarizer and the analyzer surrounding such a panel. If the image record carrier is a "linear" liquid crystal panel, the circularly polarized light originating from the cholesteric filter should first be converted into suitable linearly polarized light.

A $\lambda/4$ plate is very suitable for this purpose. This $\lambda/4$ plate preferably has a wide band so that it is active in substantially the full visible wavelength range and can thus also be used for colour image projection.

A wideband $\lambda/4$ plate is a transparent element which is composed of, for example a plurality of layers which jointly realise such a phase shift in a beam at all wavelengths ($\lambda$) in the visible wavelength range that circularly polarized light is converted into linearly polarized light. Such a $\lambda/4$ plate is described in, for example the publication "Retardation film for STN-LCDs "NRF"" by the firm of Nitto Denko in SID '92 Exhibit Guide, Society for Information Display, May 17–22, 1992, Boston, Mass. USA.

If the image record carrier modulates circularly polarized light, this $\lambda/4$ plate may be dispensed with. In fact, the light is then immediately suitable for modulation by the "circular" image display panel.

A further embodiment of the overhead projector according to the invention is characterized in that the cholesteric filter is active in at least an essential part of the full visible wavelength range.

Colour image projection can be realised in this way.

A first embodiment of the overhead projector according to the invention is characterized in that the cholesteric filter is composed of a plurality of layers of liquid crystalline material, each layer being active for a different wavelength band, which wavelength bands jointly cover substantially the full visible wavelength range.

An alternative and preferred embodiment of the overhead projector according to the invention is characterized in that the cholesteric filter has a single layer of liquid crystalline polymer material, within which layer the pitch of the molecular helix varies across the layer thickness between two values which correspond to the lower limit and the upper limit, respectively, of the wavelength band required to cover at least the full visible wavelength range.

In such a cholesteric filter having a continuously varying pitch, the liquid crystalline layer can be divided into imaginary sub-layers each having their own pitch and each consequently reflecting, in their own wavelength band, radiation in the state of polarization which is unwanted for the image display panel. All sub-layers combined realise reflection in the desired wavelength range so that a single layer is sufficient to cover the full visible wavelength range (between 400 and 780 nm). By continuous variation of the pitch within a single layer it is sufficient to use a layer thickness which is smaller than the total thickness required when stacking discrete layers so as to realise the desired reflection in the same wavelength band, which leads to a better optical quality of the filter. Moreover, the viewing angle dependence of the filter increases with an increasing thickness. This means that the effectiveness of the filter decreases considerably with larger layer thicknesses for radiation incident at an angle which is larger than a given angle of incidence.

A further embodiment of the overhead projector according to the invention is characterized in that at least a plurality of layers of the cholesteric filter comprises a liquid crystalline polymer material, within which layers the pitch of the molecular helix varies across the layer thickness between two values which correspond to the lower limit and the upper limit, respectively, of the reflection band of the relevant layer.

By varying the pitch in a plurality of layers or in each layer of the filter, the wavelength range of the relevant layer is increased. Consequently, the number of layers required to cover the full visible wavelength range may be limited considerably so that the previously mentioned advantages of a smaller number of filter layers also apply in this case.

Another embodiment of the overhead projector according to the invention is characterized in that a liquid crystalline switching cell is arranged between the support and the polarizing system, and in that a pre-analyzer is arranged between the switching cell and the support.

The pre-analyzer may be implemented in such a way that the direction of polarization transmitted by the pre-analyzer corresponds to the direction of polarization transmitted by the projection screen. For example, in the unenergized state, the switching cell will transmit the light supplied by the polarizing system of the overhead projector in an unobstructed way. Consequently, this beam will also be transmitted by the pre-analyzer. The maximum intensity is now incident on the image record carrier. In the energized state, the switching cell will influence the direction of polarization of the light supplied by the polarizing system, so that at least a part thereof will be blocked by the pre-analyzer. The extent of energization of the switching cell determines the quantity of light which will be transmitted by the pre-analyzer. The combination of a switching cell and a pre-analyzer may be used to great advantage in a number of cases where the intensity of the signal light on the projection screen must be adapted to the projection circumstances.

An embodiment of the presentation system according to the invention is characterized in that an adjustable polarization rotator is arranged between the support and the image projection screen for adjusting the direction of polarization of the light exiting from the image record carrier.

If the screen is provided with a linear polarizer and the overhead projector supplies linearly polarized radiation, it is desirable to have a facility of adapting the direction of polarization of the signal light from the image record carrier on the overhead projector to the direction of polarization transmitted by the image projection screen, because the directions of polarizations are not standardized. This can be realised, for example by means of an adjustable polarization rotator so that the light efficiency of the projection can be improved considerably.

If the screen is provided with a circular polarizer and the signal light to be projected thereon is circularly polarized, this adaptation of the direction of polarization is not necessary.

A suitable embodiment of the presentation system according to the invention is characterized in that the adjustable polarization rotator comprises a first and a second $\lambda/4$ plate, the first $\lambda/4$ plate being oriented at an angle of 45° to the direction of polarization of the light beam supplied by the overhead projector, and the second $\lambda/4$ plate being rotatable to adapt said direction of polarization to the direction of polarization transmitted by the image projection screen.

The first $\lambda/4$ plate converts the linearly polarized light from the overhead projector into circularly polarized light. This circularly polarized light is then converted by the second $\lambda/4$ plate into linearly polarized light again whose direction of polarization is adapted to that of the screen. When colour image projection is used, the $\lambda/4$ plates are preferably wideband plates.

DETAILED DESCRIPTION OF THE PREFERRED EMBODIMENTS

Figure 1:
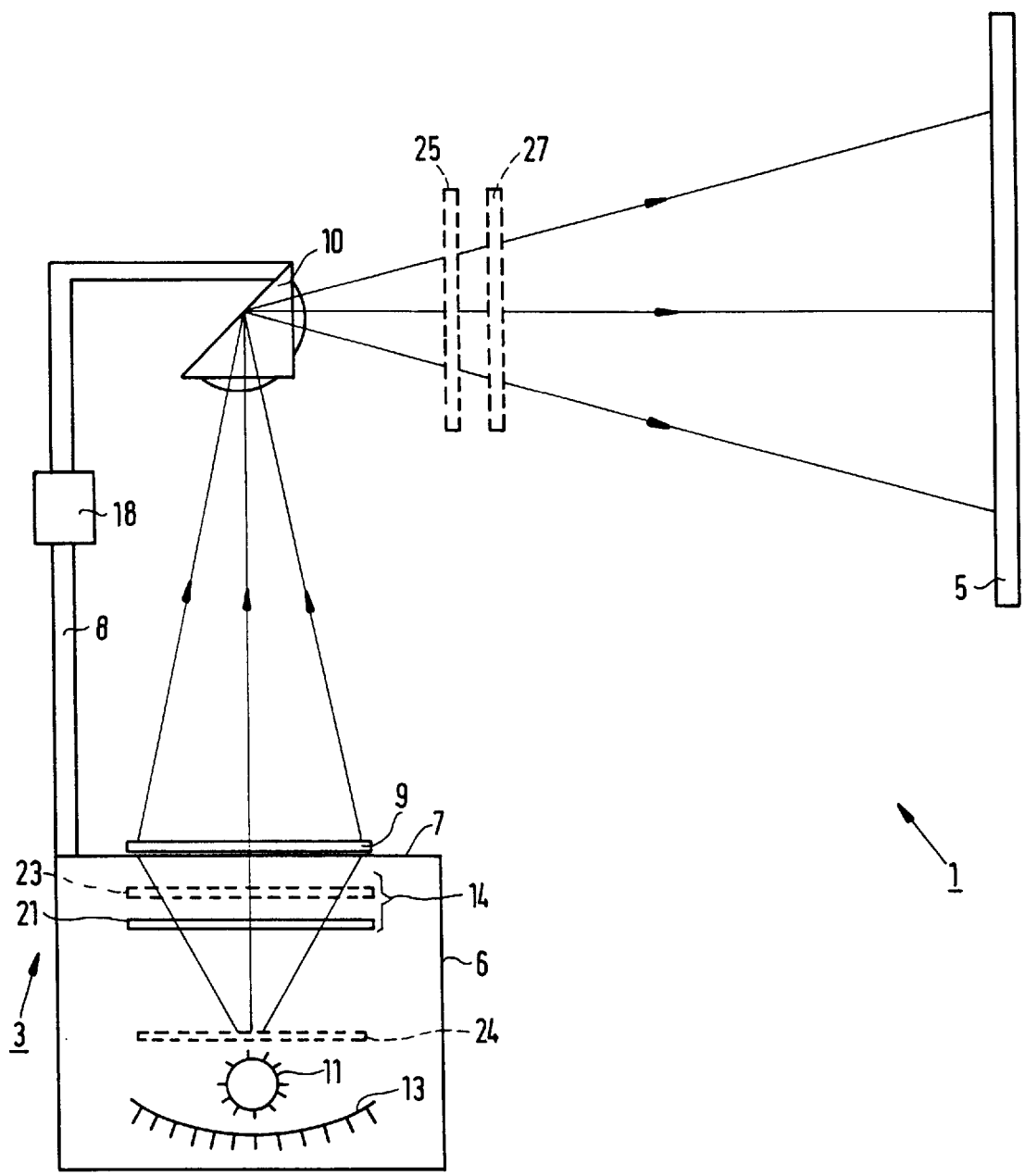
FIG. 1 shows diagrammatically an embodiment of a presentation system according to the invention.

The presentation system 1 shown diagrammatically in FIG. 1 comprises an overhead projector 3 and an image projection screen 5. The overhead projector 3 comprises a frame 6 with a support 7 for supporting an image record carrier 9. A projection head 10 for projecting the image present in the image record carrier 9 on the screen 5 is secured to the frame 6 via an arm 8. Generally, the head 10 is adjustable in height by means of an adjusting knob 18 and the projection head 10 may tilt, for example about an axis perpendicular to the plane of the drawing so as to optimally align the image with respect to the screen 5. Moreover, the overhead projector 3 is provided with an illumination system comprising, inter alia a lamp 11.

The way in which the projection optical system and the projection head are implemented optically and constructively is not important for the relevant invention and will therefore not be described.

Examples of image record carriers are a transparent foil, a TN-LCD panel, a DMD panel and a PDLC panel with or without two complementary polarizers. A transparent foil, a PDLC panel without polarizers and a DMD panel directly modulate the intensity of light incident thereon, while a TN-LCD panel and a PDLC panel with polarizers modulate light incident thereon via a change of the state of polarization. This change is converted into an intensity variation by an analyzer.

A PDLC layer consists of droplets of birefringent material dispersed in a matrix of a transparent polymer. If a PDLC panel without polarizers is used, this material is present between two ordinary glass plates provided with control electrodes at both sides. Per pixel an electric field is applied in conformity with the image part to be displayed by said pixel. Light incident on the panel is diffused by the pixels, dependent on the electric field applied across these pixels. The light from the different pixels of the panel is subsequently converted by means of, for example Schlieren optics into the image to be projected. Such a PDLC panel is known from, for example European Patent Application EP 0 490 171 A2.

A PDLC panel which modulates the direction of polarization of light is known per se from, for example the article: "A full-colour TFT-LCD with a polymer-dispersed structure" by H. Yoshida et al. in Japan Display '92, pp. 631–634. The image display panel as described in this article has a PDLC layer as an optically active dispersive medium as described above, but is now enclosed between two absorbing polarizers having a complementary direction of polarization. If no electric field is applied across the layer, the molecules within the droplets have a given net orientation, but the orientation between the droplets themselves is different. Unpolarized light will be polarized by the first polarizer. Due to diffusion within the PDLC, the polarized light is depolarized and consequently substantially 50% will be transmitted towards the audience by the second polarizer. In this case the image display panel is in the bright state. However, when an electric field is applied across the pixels, in other words when image information to be displayed is applied to the image display panel, and the molecules are thus subject to an electric field, the molecules within the droplets will orient substantially perpendicularly to the substrate and the PDLC itself will become locally transmissive. The light coming from the first polarizer is not depolarized locally but passed unobstructed by the PDLC and consequently absorbed by the second polarizer. In this case the relevant pixel produces a dark image.

The PDLC material within a pixel is thus switchable between a depolarizing and a non-depolarizing state, which in the embodiment with complementary polarizers corresponds to a light-transmissive and an opaque state, respectively, of the relevant pixel of the image display panel.

A DMD panel may be used if the overhead projector is adapted to project images of reflecting image record carriers. A DMD is a semiconductor element which is made of a single silicon wafer and comprises a matrix of deformable mirror elements. Each mirror element may tilt in conformity with a voltage applied across this element, which voltage represents the image information to be displayed. In this way, light which is incident on the matrix of mirror elements is reflected at different angles into or out of the system. Subsequently, the light reflected in the system is concentrated by means of an optical system and converted into an image via a lens system. The image information to be reproduced is thus derived from the angle at which the incident light is reflected by the mirror elements, rather than from the modulation of the state of polarization presented to the panel. When a linearly polarized beam is presented to a DMD panel, the state of polarization of the presented light will not be influenced. A DMD panel is known from, for example the article "Digital micromirror array for projection TV" by Michael A. Mignardi in Solid State Technology, July 1994, pp. 63–68.

Known presentation systems have the drawback of a relatively low contrast if the audience space is not darkened considerably. In fact, in addition to the light from the image record carrier 9, in other words the signal light, there will also be ambient light incident on the screen 5 and reflected towards the audience space.

An additional drawback becomes manifest if the image record carrier is an image display panel which modulates polarized light. Such a panel is generally surrounded by a polarizer at one side and an analyzer with the complementary direction of polarization at the other side. The panel modulates the state of polarization of the light incident thereon in conformity with the image information to be projected, which image information is applied to the pixels of the image display panel. The light to be modulated is preferably polarized. If not, substantially 50% of the unpolarized incident light is lost due to absorption or reflection by the polarizer, which is at the expense of the brightness of the image. If this polarizer absorbs the unwanted direction of polarization, the polarizer will heat up, which is undesirable because it is arranged relatively proximate to the liquid crystalline layer and may damage this layer.

The present invention proposes a presentation system in which use is made of a polarizing image projection screen having a given state of polarization, in combination with an overhead projector which is adapted in such a way that the supplied signal light has a direction of polarization which corresponds to the direction of polarization transmitted by the polarizing screen.

The signal light then has a direction of polarization which corresponds to the direction of polarization transmitted by the screen polarizer and will thus be substantially completely transmitted by the polarizer of the screen. However, the ambient light is unpolarized and substantially 50% of this light will be blocked by the screen polarizer. In this way, an image having a considerably enhanced contrast is obtained, independently of the image record carrier used. If an image record carrier is used which modulates the state of polarization of light, the light incident on the image record carrier has already been polarized in advance so that heating of the polarizer which forms part of the image record carrier is avoided, or even the polarizer can be dispensed with.

In order for the overhead projector 3 is to supply polarized light, a polarizing system 14 is arranged in the illumination system. This polarizing system 14 may consist only of an absorbing polarizer 21 which absorbs the unwanted direction of polarization and transmits the direction of polarization corresponding to the screen. However, the polarizing system 14 preferably comprises a reflecting polarizer 21 in combination with a reflector 13. There may also be a λ/4 plate 23, 24 in the illumination system. The absence or presence, the function and position of the λ/4 plate will be described hereinafter. The reflector 13 is present at a side of the lamp 11 facing away from the polarizer 21 and ensures, inter alia that a maximum possible quantity of the light emitted by the lamp 11 and facing away from the support 7 will be sent towards the support 7.

The reflector 13 may be, for example a depolarizing reflector. In that case the light reflected by the reflecting polarizer 21 is converted into unpolarized light by the reflector 13. A part of this light will then be suitable for transmission by the polarizer 21, whereas the other part is sent to the reflector 13 again where it is to be depolarized. In this case there is no λ/4 plate between the polarizer 21 and the reflector 13.

A reflector 13 may alternatively be a specular reflector. If the polarizer 21 is a circular polarizer such as a cholesteric filter, the direction of rotation of the circularly polarized light reflected by the reflecting polarizer 21 is inverted in its direction of rotation by the reflector 13 so that this light is also suitable to be transmitted towards the support 7 by the polarizer 21. If the polarizer is a linear polarizer, a birefringent element such as, for example a λ/4 plate 24 is to be arranged between the reflector and the polarizer so as to convert the unwanted linear direction of polarization into the desired direction, whereas such an element is not required when a circular polarizer is used. In each case, substantially all light supplied by the lamp is converted into light having the desired direction of polarization.

Both the overhead projector 3 and the screen 5 may be implemented in different ways.

The image projection screen 5 may be, for example a metal screen whose side facing the audience space is provided with a linear polarizer. This polarizer blocks substantially 50% of the ambient light, for example due to absorption. Such a projection screen is known, for example from European Patent Application EP 0 295 913 B1 (U.S. Pat. No. 4,928,128).

Figure 2:
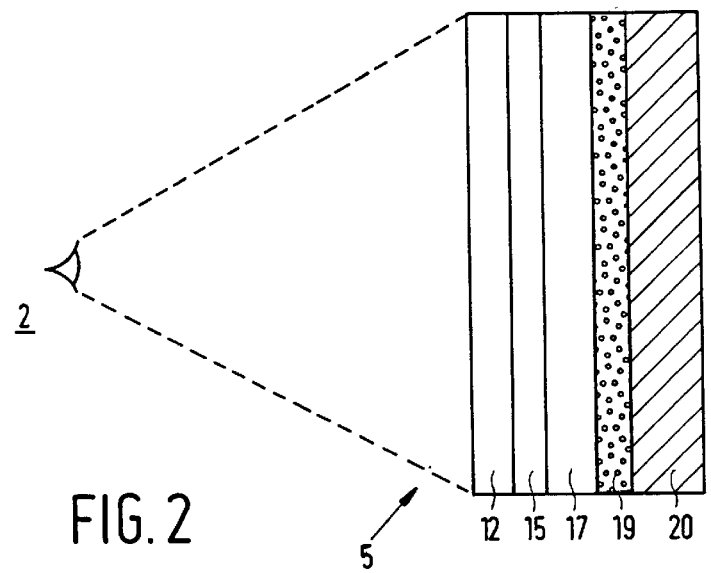
FIG. 2 shows diagrammatically a polarizing image projection screen suitable for use in a presentation system according to the invention.
Figures 3A, 3B:
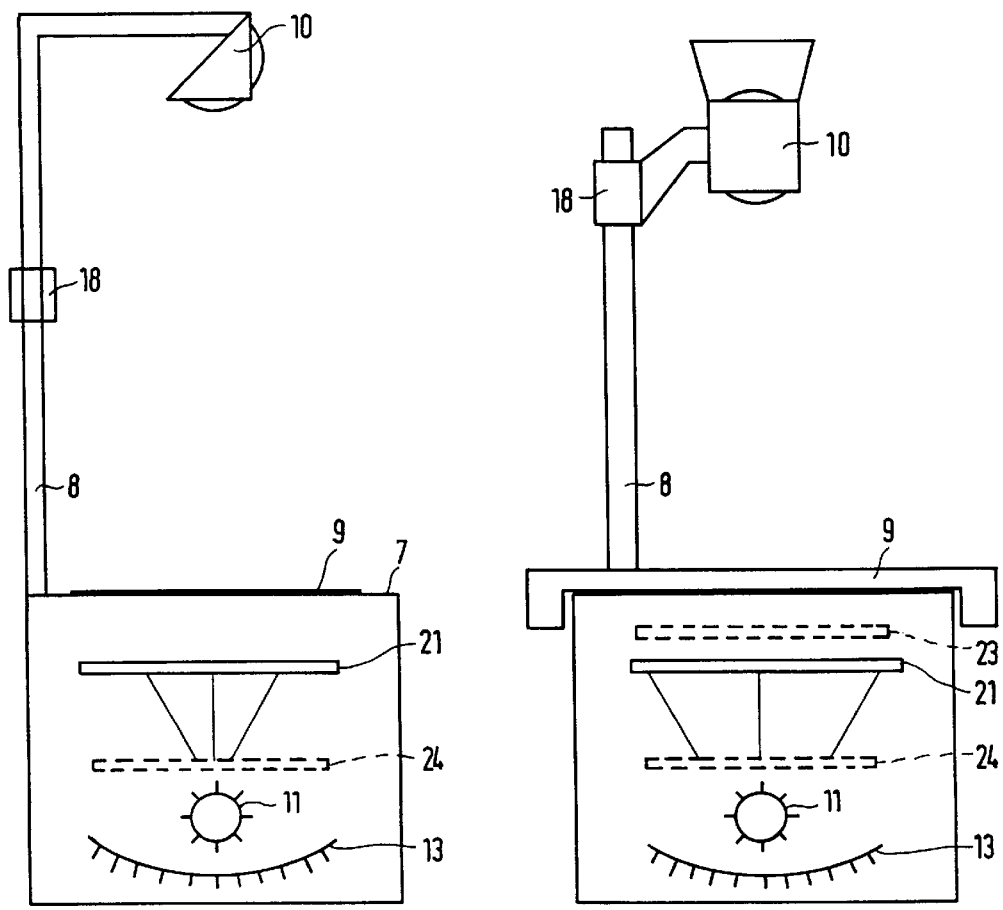
FIG. 3 shows diagrammatically an overhead projector according to the invention, with a transparent foil (a) and an image display panel (b) as image record carrier on the support.

The image projection screen may also be implemented as described in the non-prepublished European Patent Application no. 94202851.5 (U.S. Pat. No. 5,486,884). A projection screen as described in this Application is shown diagrammatically in FIG. 2 and, viewed from the front side, in other words the side facing the audience space 2, successively comprises a first, linear polarizer 12, a λ/4 plate 15, a cholesteric filter 17 and a reflecting coating 19 which also operates as a depolarizing diffusor. This means that polarized light incident on this coating 19 is not only diffusely reflected but also partly converted into unpolarized light, in other words into light which has different polarization components. The above-mentioned components 12, 15, 17 and 19 are arranged on a carrier 20.

When such an image projection screen is irradiated by light having a well-defined direction of polarization which corresponds to the direction of polarization transmitted by the linear polarizer 12, the polarizer 12 will transmit substantially 90% of the light emitted by the image-generating device, while substantially 50% of the ambient light will be absorbed. Subsequently the linearly polarized light, consisting of signal light and ambient light which leaves the polarizer 12, is incident on a λ/4 plate 15 which converts the linearly polarized light into, for example dextrorotatory circularly polarized light. The subsequent cholesteric filter 17 is transparent to this light and passes the dextrorotatory circularly polarized light to the reflecting coating 19 on which an image is formed. The light is not only diffusely reflected but also depolarized on this coating 19. In other words, the dextrorotatory circularly polarized light is converted into dextrorotatory and laevorotatory polarized components. The dextrorotatory component is passed by the cholesteric filter 17, while the laevorotatory component is reflected again by the filter 17 to the reflecting coating 19 so as to be depolarized, reflected and partly passed by the filter again. Due to the repeated process of reflections and depolarization within the screen, a high percentage, for example 80%, of the signal light incident on the screen is reflected towards the audience space. It is true that the same percentage of the ambient light incident on the projection screen and passing through the polarizer 13 is reflected towards the audience space. However, since this light only amounts to half the total quantity of ambient light, only 40% of the ambient light incident on the screen is reflected.

FIGS. 1, 4a and 4b show embodiments of an overhead projector. Since the use and the position of the λ/4 plates 23, 24 may be facultative and depends on the desired state of polarization of the light supplied by the overhead projector 3, vz. linear or circular, these plates are shown in broken lines.

The overhead projector comprises a lamp 11 which is arranged between a reflector 13 and a reflective polarizer 21. Light emitted by the lamp 11 and directed away from the support 7 is as yet passed by the reflector 13 towards the support 7. The p-polarized component of the unpolarized light emitted by the lamp 11 is passed by the polarizer 21 towards the support 7, while the s-polarized component is reflected towards the lamp 11. Moreover, a λ/4 plate 24 is arranged between the lamp 11 and the polarizer 21 so as to ensure that the s-component reflected on the polarizer 21 in the path between the polarizer 21 and the reflector 13 behind the lamp 11 is converted into p-polarized radiation so as to be subsequently passed by the reflective polarizer 21. In this way, substantially all light which is supplied by the lamp is converted into p-polarized light. Such an overhead projector is described in, for example European Patent Application EP 0 573 905 A1.

In accordance with a further aspect of the present invention, a novel overhead projector supplying a polarized light beam is provided. In this case the polarizer 21 is constituted by a cholesteric filter 21, combined or not combined with a λ/4 plate 23, dependent on whether the light incident on the image record carrier 9 should be linearly or circularly polarized. For example, the dextrorotatory circularly polarized component of an unpolarized beam coming from the lamp 11 will be passed by the cholesteric filter 21 towards the support 7, whereas the laevorotatory circularly polarized component will be reflected towards the lamp 11. Upon reflection on the reflector 13 which is arranged behind the lamp 11, the direction of polarization of the latter component will be inverted. Since this component is then also dextrorotatory circularly polarized, it will consequently also be passed by the cholesteric filter 21 towards the support 7. In this way, substantially all radiation from the radiation source 11 is converted into radiation having the same circular direction of polarization.

If linearly polarized radiation is desired, if the image record carrier is a "linear" image display panel, a λ/4 plate 23 may be arranged between the cholesteric filter 21 and the support 7, so that the circularly polarized radiation is converted into linearly polarized radiation.

In the embodiments of the overhead projector, in which substantially all the light supplied by the lamp is converted into polarized light, the brightness of the image is enhanced considerably if the image record carrier modulates the direction of polarization of the light.

The known cholesteric filters are only operative within a relatively limited wavelength reflection band, for example 50 nm. Radiation having a wavelength outside this wavelength reflection band is passed unpolarized, which means that the filter operates as a polarizer only in a limited wavelength range. For colour image overhead projection it is, however, desirable that the cholesteric filter can convert the state of polarization in the full visible wavelength range whose wavelength band is, for example 380 nm.

A cholesteric filter which is operative in the full visible wavelength range may be realised in different manners.

A first possibility is to stack a number of narrow-band cholesteric layers each having a different reflection band. The composite filter then has a total wavelength reflection bandwidth which is equal to the sum of the reflection bandwidths of the separate layers and which is sufficient to polarize radiation in the full visible wavelength range.

A second possibility is to manufacture the cholesteric filter from a single layer of liquid crystalline polymer material, in which the pitch p of the molecular helix varies across the layer thickness between a lower limit and an upper limit, so that the resultant reflection bandwidth corresponds to the bandwidth which is required for the filter to be operative in the full visible wavelength range. As compared with a stacked filter, a single-layer filter has the advantage of a better optical quality. In fact, when layers are stacked, the optical quality decreases with an increasing number of layers due to the presence of errors in the cholesterics and due to the loss of planar molecular ordering. For the manufacture of a wideband single-layer cholesteric filter having a pitch varying across the layer thickness, reference is made to European Patent Application EP 0 606 940 A2.

An embodiment in which the optical quality of the filter is still better and the viewing angle dependence is smaller than in a cholesteric filter composed of a plurality of narrow-band layers is constituted by a cholesteric filter which is made of a plurality of layers in which the pitch p of the molecular helix varies across the layer thickness in at least a plurality of these layers. In this way, the reflection bandwidth of the relevant layer can be increased to, for example 150 nm.

Figure 4:
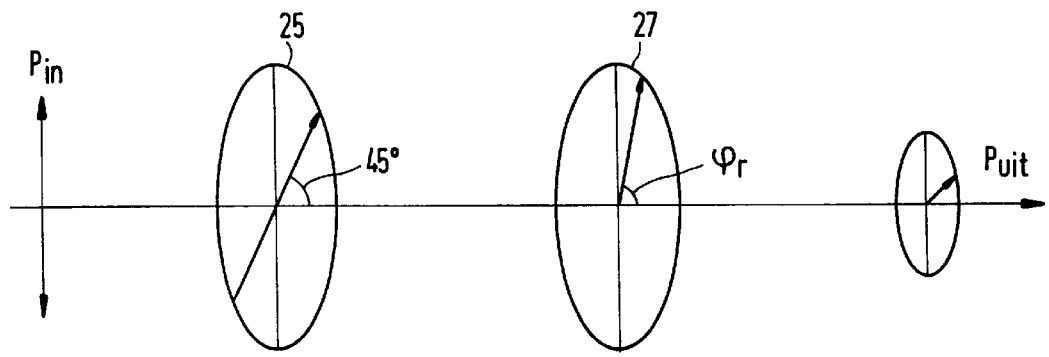
FIG. 4 shows the rotation of the direction of polarization by means of two achromatic $\lambda/4$ plates when the states of polarization of the polarizing image projection screen and the signal light are linear.

Since the direction of polarization transmitted by the screen polarizers and of the light supplied by overhead projectors is not standardized, it is possible to rotate the direction of polarization of the linearly polarized light from the image record carrier and hence from the overhead projector before the light reaches the image projection screen by arranging two achromatic λ/4 plates one behind the other in the path of the linearly polarized light, the second plate being rotatable so as to adapt the direction of polarization to the direction of polarization transmitted by the image projection screen. This conversion of the direction of polarization is illustrated in FIG. 4. The direction of polarization of a first λ/4 plate 25, which is arranged in the path of the linearly polarized light generated by the projector 3, extends at an angle of 45° to the incident direction of polarization $P_{in}$. λ is the central wavelength of the light beam. This λ/4 plate 25 converts the linearly polarized light into circularly polarized light. Subsequently, the circularly polarized light is incident on a second λ/4 plate 27. The light is linearly polarized again by this plate 27. By varying the orientation $\phi_r$ of the second λ/4 plate 27 with respect to the incident direction of polarization $P_{in}$, the direction of polarization $P_{out}$ of the exiting beam can be adjusted. In this way, the direction of polarization of the projected image can be adapted to the direction of polarization transmitted by the image projection screen.

If a colour image is projected, the λ/4 plates must be operative as polarization converters in the full visible wavelength range. Such wideband λ/4 plates are known per se and described in, for example the publication "Retardation film for STN-LCDs 'NRF'" of the firm of Nitto Denko in SID '92 Exhibit Guide, Society for Information Display, May 17–22, 1992, Boston, Mass. USA.

When the signal light from the overhead projector is circularly polarized and the screen is provided with a circular polarizer, the adjustable polarization rotator can be dispensed with.

FIG. 4a shows an embodiment of an overhead projector with a transparent foil having a permanent image as an image record carrier 9. FIG. 4b shows an embodiment of an overhead projector with an image display panel as an image record carrier which adds image information to polarized or unpolarized light. In the embodiment shown in FIG. 4b, the arm 8 which supports the projection head 10 is mounted to the front and rear sides of the frame 6 instead of to one of the sides as in FIG. 4a.

Figure 5:
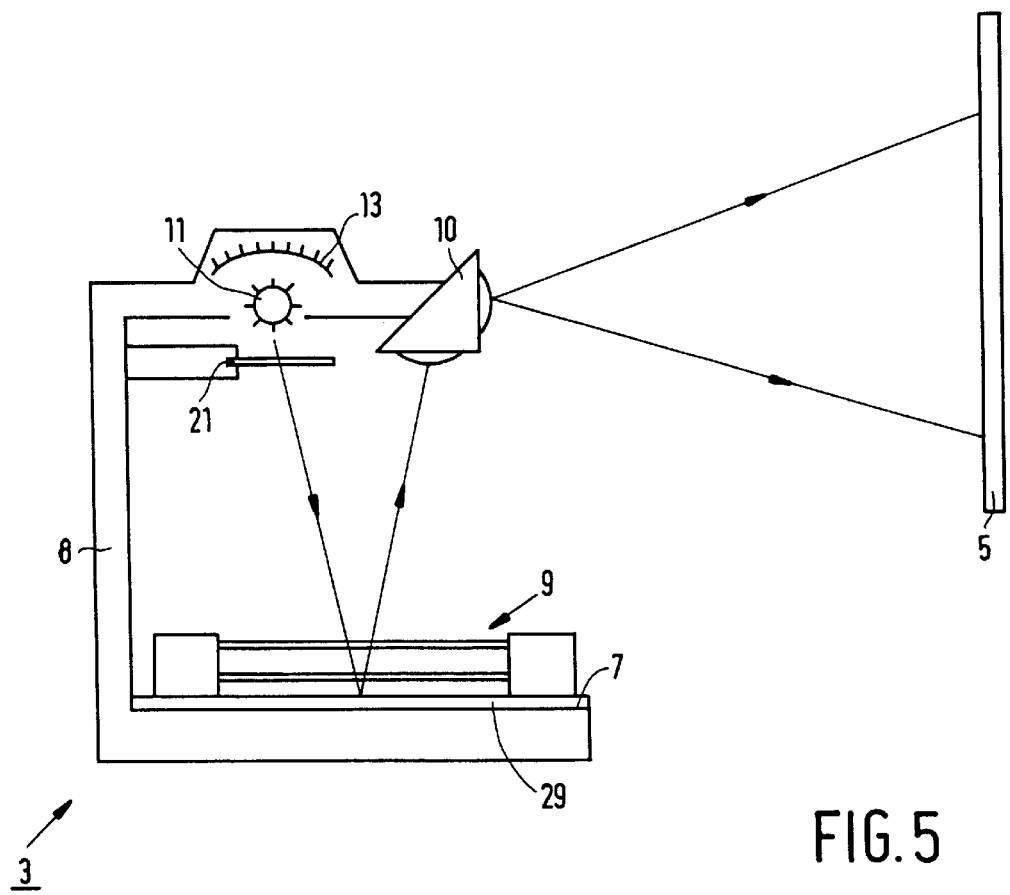
FIG. 5 shows diagrammatically an overhead projector with a reflective image record carrier.

The present invention is applicable to an overhead projector operating with transmissive image record carriers as well as to an overhead projector operating with reflective image record carriers. FIGS. 1, 4a and 4b show an overhead projector with a transmissive image record carrier. An embodiment of an overhead projector with a reflective image record carrier is known from, for example U.S. Pat. No. 4,818,074. FIG. 5 shows an embodiment of a presentation system according to the invention, with a reflective overhead projector. The lamp 11 is now arranged at the same side of the support 7 as the projection head 10. The reflector 13 is arranged behind the lamp 11 and ensures that the light which is not transmitted by the lamp 11 towards the support 7 is as yet passed towards the support 7. A reflecting element 29, for example a reflecting Fresnel lens is arranged between the image record carrier 9 in the form of a transparent foil and the support 7. The polarizer 21 whose direction of polarization corresponds to the direction of transmission polarization transmitted by the screen is arranged between the lamp 11 and the support 7 supporting the image record carrier 9, so that the light incident on the image record carrier 9 has already been polarized. Light from the lamp 11 passes through the image record carrier 9 to the Fresnel lens 29 on which the light is reflected. The light reflected by the lens 29 is passed through the image record carrier 9 towards the projection head 10 and is subsequently projected on a screen. Here again, a λ/4 plate may be arranged between the lamp 11 and the polarizer 13 and/or between the polarizer 21 and the image record carrier 9 for reaching the same effects as described above with reference to these λ/4 plates.

The transparent foil and the reflecting element may alternatively be replaced by, for example a DMD panel (Digital Micromirror Device) as already mentioned hereinbefore, by a reflective TN-LCD panel or by a reflective PDLC panel.

Figure 6:
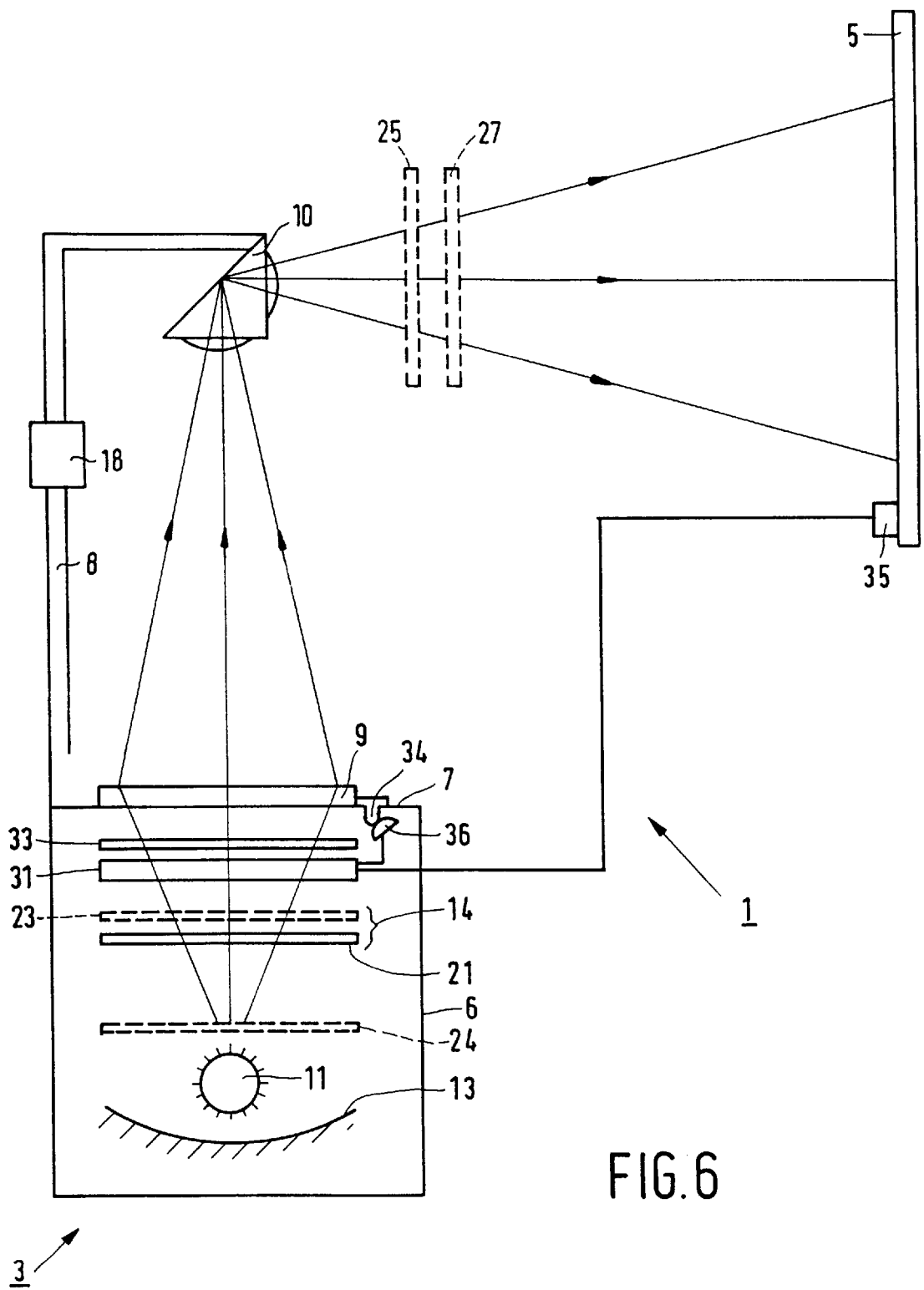
FIG. 6 shows diagrammatically an embodiment of a presentation system according to the invention, as shown in FIG. 1, in which the overhead projector is provided with a switching cell and a pre-analyzer, and in which the projection screen is provided with an ambient light sensor.

Moreover, the overhead projector 3 may be provided with an LCD switching cell 31 in combination with a pre-analyzer 33, as is shown in FIG. 6. The direction of polarization transmitted by the pre-analyzer 33 may be chosen to be such that it corresponds to the direction of polarization transmitted by the projection screen 5 and the direction of polarization supplied by the polarizing system 14 of the overhead projector 3. The switching cell 31 may be chosen to be such that, in the unenergized state, the direction of polarization supplied by the polarizing system 14 will not be influenced and will consequently be transmitted by the pre-analyzer 33, whereas in the energized state the direction of polarization will be influenced and at least partly blocked by the pre-analyzer 33. This means that the maximum intensity is incident on the image record carrier 9 in the unenergized state of the switching cell 31. The energized and unenergized states of the switching cell are interchangeable by changing the mutual relation between the direction of polarization of the beam supplied by the polarizing system and that of the pre-analyzer.

The assembly 31, 33 is preferably arranged in the light path between the polarizing system 14 and the support 7 of the overhead projector 3.

Consequently, the polarized beam supplied by the polarizing system 14 is incident on the switching cell 31. In accordance with the above-mentioned embodiment, substantially all the polarized light will be transmitted by the switching cell 31 and the pre-analyzer 33 towards the image record carrier 9 when the switching cell 31 is not energized. When the switching cell is fully energized, substantially all the polarized light supplied by the overhead projector will disappear from the light path, so that substantially no light win be incident on the image record carrier. All intermediate situations can be achieved by modifying the extent of energization of the switching cell.

Dependent on its thickness and refractive index of its liquid crystalline layer, the switching cell will be suitable for influencing the circular or linear state of polarization of the light supplied by the polarizing system of the overhead projector.

If the beam supplied by the overhead projector is linearly polarized, the pre-analyzer 33 may be implemented, for example as an optically transparent plate arranged at the Brewster angle in the beam, so that, for example the p-polarized component is transmitted and the s-polarized component of the beam is reflected.

If the overhead projector supplies circularly polarized light, the preanalyzer should be a circular polarizer.

The above-mentioned assembly of switching cell 31 and pre-analyzer 33 may be used in different manners to adapt the intensity of the projected image to various external circumstances.

A first use relates to the intensity control of the projected light for different image record carriers. If the image record carrier is an LCD panel, the beam supplied by the overhead projector should have a relatively high intensity so as to realize an image having an acceptable brightness. In fact, liquid crystalline colour display panels transmit very little light because only ⅓ of the light is suitable for each pixel, due to the presence of the colour mosaic filter. A minimum intensity of the light source is required for colour display panels. If there is sufficient light for displaying an image coming from a colour display panel, there will be a great risk that the illumination is much too intensive when, without further measures, the same overhead projector is used to project an image of a transparent foil. To ensure that one and the same overhead projector can be used for projecting images of colour display panels as well as transparent foils, in which the images of a colour display panel and a transparent foil as record carriers do not differ too much in brightness, the intensity of light incident on the image record carrier can be controlled by means of a switching cell and a pre-analyzer as follows. One solution is to provide the overhead projector 3 with a detection element 36 which is capable of detecting whether the image record carrier 9 is an LCD or a transparent foil and establishes a connection with the switching cell 31. The element 36 may be of, for example a mechanical type as is shown in the English-language abstract of JP-A 4-15634, and may react to the presence of a protrusion 34 provided on the LCD. In the above-mentioned example, in which the switching cell in its unenergized state transmits the direction of polarization supplied by the polarizing system, the switching cell should be unenergized if the detection element 36 is activated. When the colour display panel is removed or when a transparent foil is laid on the overhead projector, the detection element 36 will no longer be activated. The switching cell will be energized at that instant and transmit at most a part of the polarized beam supplied by the overhead projector, so that the audience will not be dazzled by the light.

A switching cell may also be used for adapting the intensity of the projected signal light to the ambient light. To this end, an ambient light sensor 35 (see FIG. 6) should be arranged in or proximate to the projection screen 5 so as to measure the intensity of the ambient light. By establishing a connection between this sensor 35 and the switching cell 31, it can be ensured that the switching cell is not energized when there is much ambient light and thus transmits substantially all the light supplied by the polarizing system. If there is not much ambient light, an acceptable contrast can be realized with less intensity and the switching cell may be energized so that only a part of the light supplied by the polarizing system will be transmitted by the pre-analyzer 33. Since this use applies to both colour display panels and transparent foils, this switching cell function may be combined with the first-mentioned function.

Yet another use is to provide the overhead projector with a switch (not shown) for the user, which switch can control the switching cell. In this way, the user is enabled to reduce the intensity of the signal light considerably for a given period when the projector is not used and without having to extinguish the lamp. When the projection is to be continued again, the projector will immediately react by giving the switch such a position that the switching cell is no longer energized. A switch position should correspond to the energized state of the switching cell, notably the dark state of the projector, whereas the other switch position should correspond to the unenergized state of the switching cell, hence to the bright state of the projector. It may further be ensured that the projector switches itself off after having been in the dark state for a given period of time. This switching cell function may be combined with one of the two, or with both functions described hereinbefore.

What is claimed:

1. A presentation system comprising
    an illumination system which provides a polarized projection beam having an intensity and a direction of polarization, said illumination system comprising a cholesteric filter, a light source, and a reflector surrounding said light source at a side away from the cholesteric filter,
    an image record carrier which modulates the intensity of the polarized projection beam with image information, thereby producing a modulated and polarized beam having said direction of polarization,
    an optical head for projecting the modulated and polarized beam onto a screen, said illumination system, said image record carrier, and said optical head forming an overhead projector, and
    a polarizing screen which receives said modulated and polarized beam from said overhead projector and transmits radiation having said direction of polarization.

2. A presentation system as in claim 1 wherein said image record carrier is a permanent image record carrier which directly modulates the intensity of the projection beam with image information.

3. A presentation system as in claim 1 wherein said image record carrier is an electronically controllable image display panel which directly modulates the intensity of the beam with image information.

4. A presentation system as in claim 3 wherein said electronically controllable image display panel modulates the direction of polarization of the projection beam in order to modulate the intensity of the beam with image information.

5. A presentation system as in claim 1 further comprising a λ/4 plate arranged at a side of the cholesteric filter facing away from said light source.

6. A presentation system as in claim 1 where in said cholesteric filter is active throughout essentially the entire visible wavelength range.

7. A presentation system as in claim 6 wherein said cholesteric filter comprises a plurality of layers of liquid crystal material, each layer having a thickness and being active in respective different wavelength bands, said wavelength bands jointly covering essentially the entire visible wavelength range.

8. A presentation system as in claim 6 wherein said cholesteric filter consists of a single layer of liquid crystal polymer material having a thickness, said polymer material comprising a molecular helix having a pitch which varies across the thickness between two values which correspond to respective upper and lower limits of essentially the entire visible wavelength range.

9. A presentation system as in claim 7 wherein said liquid crystal material is a polymer material, said polymer material comprising a molecular helix having a pitch which varies across the thickness of the respective layer between two values which correspond to respective upper and lower limits of the wavelength band of the respective layer.

10. A presentation system as in claim 1 further comprising a liquid crystal switching cell arranged between the image record carrier and the illumination system, and a pre-analyzer arranged between the switching cell and the image record carrier.

11. A presentation system as in claim 1 further comprising an adjustable polarization rotator arranged between the overhead projector and the image projection screen.

12. A presentation system as in claim 11 wherein said adjustable polarization rotator comprises a first $\lambda/4$ plate oriented at an angle of 45° to the direction of polarization of the light beam provided by the overhead projector, and a second $\lambda/4$ plate which is rotatable to adapt the direction of polarization of the light beam to the direction of polarization of the light transmitted by the projection screen.

* * * * *